US011336567B2

(12) United States Patent
Nainar et al.

(10) Patent No.: US 11,336,567 B2
(45) Date of Patent: May 17, 2022

(54) SERVICE AWARE VIRTUAL PRIVATE NETWORK FOR OPTIMIZED FORWARDING IN CLOUD NATIVE ENVIRONMENT

(71) Applicant: Cisco Technology, Inc., San Jose, CA (US)

(72) Inventors: Nagendra Kumar Nainar, Morrisville, NC (US); Carlos M. Pignataro, Cary, NC (US); Alejandro Eguiarte, Cary, NC (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 89 days.

(21) Appl. No.: 16/853,331

(22) Filed: Apr. 20, 2020

(65) Prior Publication Data

US 2021/0328913 A1    Oct. 21, 2021

(51) Int. Cl.
   *H04L 45/00* (2022.01)
   *H04L 12/46* (2006.01)
   *H04L 45/745* (2022.01)
   *H04L 45/02* (2022.01)

(52) U.S. Cl.
   CPC .......... *H04L 45/38* (2013.01); *H04L 12/4675* (2013.01); *H04L 45/02* (2013.01); *H04L 45/745* (2013.01)

(58) Field of Classification Search
   CPC ... H04L 45/38; H04L 12/4675; H04L 45/745; H04L 45/02
   See application file for complete search history.

(56) References Cited

U.S. PATENT DOCUMENTS

| 10,944,691 | B1 * | 3/2021 | Raut | H04L 47/82 |
|---|---|---|---|---|
| 10,999,326 | B1 * | 5/2021 | Pollitt | H04L 63/20 |
| 2020/0136943 | A1 * | 4/2020 | Banyai | H04L 43/08 |
| 2020/0250006 | A1 * | 8/2020 | Parekh | H04L 67/1008 |
| 2021/0136147 | A1 * | 5/2021 | Giassa | H04L 67/34 |

* cited by examiner

*Primary Examiner* — Pao Sinkantarakorn
*Assistant Examiner* — Kabir U Jahangir
(74) *Attorney, Agent, or Firm* — Lee & Hayes, P.C.

(57) ABSTRACT

Techniques for defining a service flow definition among container pods that provide services in a network. The techniques may include an orchestrator of a computer network platform of the network determining which container pods need to communicate with which container pods. The service flow definition thus indicates needed paths between the container pods. In configurations, a cluster topology may be determined where the cluster topology indicates corresponding nodes of the network in which each container pod is located, as well as end points of the network with which the corresponding nodes communicate. Based at least in part on the service flow definition and the cluster topology, corresponding route distribution policies may be determined for the end points. The corresponding route distribution policies may be applied to the end points.

17 Claims, 7 Drawing Sheets

```
┌─────────────────────────────────────────────────────────────────┐
│ PERFORM A FIRST INSTANCE OF DETERMINING A FIRST CONTAINER POD   │
│ WITH WHICH A SECOND CONTAINER POD COMMUNICATES                  │
│                             502                                 │
└─────────────────────────────────────────────────────────────────┘
                              ▼
┌─────────────────────────────────────────────────────────────────┐
│ PERFORMING A SECOND INSTANCE OF DETERMINING A THIRD CONTAINER   │
│ POD WITH WHICH THE FIRST CONTAINER POD COMMUNICATES             │
│                             504                                 │
└─────────────────────────────────────────────────────────────────┘
                              ▼
┌─────────────────────────────────────────────────────────────────┐
│ PERFORMING A THIRD INSTANCE OF DETERMINING A FOURTH CONTAINER   │
│ POD WITH WHICH THE SECOND CONTAINER POD COMMUNICATES            │
│                             506                                 │
└─────────────────────────────────────────────────────────────────┘
                              ▼
┌─────────────────────────────────────────────────────────────────┐
│ PERFORMING A FOURTH INSTANCE OF DETERMINING A FIFTH CONTAINER   │
│ POD WITH WHICH THE SECOND CONTAINER POD COMMUNICATES            │
│                             508                                 │
└─────────────────────────────────────────────────────────────────┘
                              ▼
┌─────────────────────────────────────────────────────────────────┐
│ PERFORMING A FIFTH INSTANCE OF DETERMINING THAT THE THIRD       │
│ CONTAINER POD COMMUNICATES WITH THE FIFTH CONTAINER POD         │
│                             510                                 │
└─────────────────────────────────────────────────────────────────┘
                              ▼
┌─────────────────────────────────────────────────────────────────┐
│ BASED AT LEAST IN PART ON THE FIRST INSTANCE OF DETERMINING,    │
│ THE SECOND INSTANCE OF DETERMINING, THE THIRD INSTANCE OF       │
│ DETERMINING, THE FOURTH INSTANCE OF DETERMINING, AND THE FIFTH  │
│ INSTANCE OF DETERMINING, DEFINING SERVICE FLOW DEFINITIONS      │
│                             512                                 │
└─────────────────────────────────────────────────────────────────┘
                              ▼
┌─────────────────────────────────────────────────────────────────┐
│ BASED AT LEAST IN PART ON THE DEFINING THE SERVICE FLOW         │
│ DEFINITION, PROVIDING CORRESPONDING ROUTE DISTRIBUTION POLICIES │
│ TO CORRESPONDING END POINTS OF THE NETWORK WITH WHICH THE FIRST │
│ CONTAINER POD, THE SECOND CONTAINER POD, THE THIRD CONTAINER    │
│ POD, THE FOURTH CONTAINER POD, OR THE FIFTH CONTAINER POD       │
│ COMMUNICATE                                                     │
│                             514                                 │
└─────────────────────────────────────────────────────────────────┘
```

SERVICE AWARE VIRTUAL PRIVATE NETWORK FOR OPTIMIZED FORWARDING IN CLOUD NATIVE ENVIRONMENT

TECHNICAL FIELD

The present disclosure relates generally to routing policies among services within cloud native environments, and more particularly, to optimizing routing policies among services to minimize unneeded addresses of services within routing policies for service containers that do not communicate with one another.

BACKGROUND

Modern datacenters are increasingly using border gateway protocol (BGP) control plane (e.g., ethernet virtual private network (EVPN), Layer 3 virtual private network (L3VPN), etc.) on edge endpoints such as provider edge (PE), virtual extensible local area network tunnel end points (VTEPs) etc. to provide application workload reachability in both east to west and north to south directions, as well as workload mobility, whether the edge endpoint is located physically on a dedicated router or virtually on the server node. Cloud orchestration platforms, e.g., Kubemetes (K8S), Istio, etc., enable modern applications to leverage service definitions that describe services/microservices (referred to herein as services) and their relationship including routing rules, traffic, steering etc, and thereby allow operators of networks to automate and scale virtualized services by instantiating them as container pods across different worker nodes. Such platforms augment the application deployment with good scale, redundancy and visibility.

In large scale datacenters, depending on the application, application type, common network interface (CNI) used, etc., the number of container pods instantiated may be large (e.g., over 10,000) spanning different nodes/hosts that may be located in different sites. Immense flexibility in service/Istio deployment models may lead to issues in data center (DC) network architecture using the BGP control plane among top of racks (ToRs) edge endpoints such as VTEPs. For example, 10,000 or more MAC/IP entries related to 10,000 or more container pods (or 20,000 or more of MAC/IP entries to accommodate both IP/MAC entries and MAC only entries in certain EVPN deployments) may be advertised, thereby causing a scale issue.

One way to counter such an issue is to manually construct the MAC/IP route distribution policies so as to prohibit/control their advertisement in the BGP control plane and subsequently installing entries in a forwarding table. Since not all container pods need to communicate with all other container pods (whether the container pods are at the same or different worker nodes), routes between such container pods may be left off such a forwarding table. However, such a manual approach is error prone, complex, and generally does not work in such a large-scale environment. Generally, the cloud administrator is the entity that has to figure out which distribution policies need to be attached to which MAC and/or IP route in which particular VPN/virtual network identifier (VNI), etc. on which edge endpoint such as VTEP. In a dynamic environment such as, for example, K8S, such a manual approach is highly inefficient since container pods may exist for only a couple of hours (or even less sometimes) or may be moved to another worker node. Hence, any manually created routing policies would be rendered useless and would need to be updated again in a few hours. This is not practical.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes a method for defining a service flow definition among container pods that provide services in a network. The method may include an orchestrator of a computer network platform of the network performing a first instance of determining a first container pod with which a second container pod communicates. The first container pod provides a first service, while the second container pod provides a second service. The orchestrator may perform a second instance of determining a third container pod with which the first container pod communicates, where the third container pod provides a third service. The orchestrator may also perform a third instance of determining a fourth container pod with which the second container pod communicates, where the fourth container pod provides a fourth service. The orchestrator may also perform a fourth instance of determining a fifth container pod with which the second container pod communicates where the fifth container pod provides a fifth service. The orchestrator may also perform a fifth instance of determining that the third container pod communicates with the fifth container pod. Based at least in part on the first instance of determining, the second instance of determining, the third instance of determining, the fourth instance of determining, and the fifth instance of determining, the orchestrator may define a service flow definition. The service flow definition indicates needed communication paths between the first container, the second container, the third container, the fourth container, and the fifth container. Based at least in part on the defining the service flow definition, corresponding route distribution policies may be provided to corresponding edge endpoints of the network through which the first container pod, the second container pod, the third container pod, the fourth container pod, or the fifth container pod communicate.

In configurations, a cluster topology may be determined where the cluster topology indicates corresponding nodes of the network on which each container pod is hosted, as well as the endpoints of the network with which the corresponding nodes communicate. Based at least in part on the service flow definition and the cluster topology, the corresponding route distribution policies may be determined for the endpoints. The corresponding route distribution policies may then be applied to the endpoints.

Additionally, the techniques described herein may be performed by a system and/or device having non-transitory computer-readable media storing computer-executable instructions that, when executed by one or more processors, performs the method described above.

EXAMPLE EMBODIMENTS

With current cloud-based networks, modern applications utilize Istio/Sidecar based service definitions to describe the services and their relationship including routing rules, traffic, steering, etc. The present disclosure leverages this information to analyze and formulate service flows (also known as container pod communication flows), e.g., which container pods communicate with which container pods. For example, consider five container pods. A first container pod may provide service A for data packets while two other container pods may provide service B and service B', respectively. Once a data packet has received service A, the data packet may be forwarded to one of either the service B container pod or the service B' container pod. In general, the service B' is related to service B but may be a newer version of service B that includes updates, security patches, etc. Prior to routing data packets to service B' instead of service B, service B' needs to be tested and verified before all data packets are routed from the service A container pod to the service B' container pod instead of the service B container pod, e.g., before the service B' container pod replaces the service B container pod.

In the present example, the fourth and fifth service container pods provide service C and service C', respectively. As with service B and service B', service C' is a newer and/or updated version of service C. Once data packets have received service B at the service B container pod, the data packets may be routed from the service B container pod to either the service C container pod or the service C' container pod. However, in configurations, data packets from service B' may only be routed to the service C' container pod. Thus, service A container pod may load balance the traffic between service B and service B'. The service B container pod may load balance between the service C container pod and the service C' container pod. Finally, as previously noted, the service B' container pod, in configurations, may forward traffic only to the service C' container pod.

Thus, based on such an arrangement, a service flow definition may be formulated. For the present example service flow definition, the service A container pod must reach, e.g., communicate with the service B container pod and the service B' container pod. However, the service A container pod does not need reachability, e.g., connectivity, to the service C container pod or the service C' container pod. The service B container pod must reach, e.g., have connectivity to, the service A container pod, the service C container pod, and the service C' container pod. The service B' container pod must reach, have connectivity to, the service C' container pod and the service A container pod. However, the service B' container pod does not need reachability, e.g., connectivity to, the service C container pod. The service C container pod must reach, e.g., have connectivity to, the service B container pod, while the service C' container pod must reach, e.g., have connectivity to, the service B container pod and the service B' container pod. In configurations, based on the service flow definition, a regular container pod may be defined as a container pod that communicates with all the pods related to that service. However, a selective container pod may be defined as a container pod that communicates with only specific container pods with specific labels and/or does not communicate at all with specific container pods with specific labels.

In configurations, a cluster topology for nodes of the network may be derived. The cluster topology provides information about which container pod runs on which node, e.g., worker node, that is connected to which edge endpoints such as virtual extensible local area network (VxLAN) tunnel endpoints (VTEPs).

In a configuration, the cluster topology may be derived and kept up to date based on using init-container in a container pod (prior to running an application/service in the container pod). The init-container may run a utility that detects the ToRs/VTEPs to which the worker node is connected, e.g., using for example, link layer discovery protocol (LLDP) and create a mapping. The init-container may then notify (via an application programming interface (API)) the mapping to the backend software defined networking (SDN) controller. This allows the SDN controller to create/update the mapping of each container POD and corresponding worker node and ToR/VTEP connectivity with sufficient details.

In another configuration, the cluster topology may be derived by periodically communicating with the K8S master controller or orchestrator to detect container pod creation or deletion events and obtaining details about the container pods such as, for example, IP/MAC addresses, the related worker node (such as, for example, IP/MAC address), etc. The SDN controller may already be aware of which ToR/VTEP has the IP/MAC addresses of each worker node and its address resolution protocol (ARP)/neighbor discovery protocol (NDP) table. Alternatively, the SDN controller may poll the ToR/VTEPs as needed since worker nodes need to have communication (via layer two or layer three) with the K8S master controller or orchestrator via the ToR. This allows the SDN controller to create/update the mapping of POD and corresponding worker nodes and ToR/VTEP connectivity with sufficient details.

In configurations, once the service flow definition and cluster topology are defined, the orchestrator may use that to automatically create granular IP/MAC route distribution policies. In configurations, the policies may be specific to service container pods that are newly instantiated.

Once the route distribution policies are created, the route distribution policies may be applied on edge endpoints such as VTEPs. This could be done using either the management plane or control plane protocol. For example, in configurations the SDN controller may be a dedicated process that runs on the K8S master node and maintains a management plane session (e.g. network configuration protocol (NETCONF)/yet another network generation (YANG)) or control plane session (e.g. BGP) with all VTEPs that are part of the cluster topology (worker-node VTEPs and external VTEPs (ext-VTEPs)). The SDN controller may use a route distribution policy to determine which MAC/IP routes need to be advertised (and received) from which worker node VTEP to the ext-VTEPs and to each of the other worker node VTEPs. Specifically, the SDN controller may distribute to each worker node VTEP only the MAC-only routes and the MAC/IP routes from other worker node VTEPs that are required by the service as well as all routes from the ext-VTEPs. The creation of the local MAC/IP routes on each worker node VTEP may rely on the normal VXLAN EVPN flow allowing them to be dataplane driven. Once the local IP/MAC learning has occurred, the SDN controller may advertise all MAC/IP routes from all worker node VTEP to the ext-VTEPs. In configurations, the SDN controller may reflect all MAC/IP routes learned from the ext-VTEPs to all worker node VTEPs.

Applying the above logic to the example topology (illustrated in FIG. 5), the service A container pod is expected to communicate with the service B container pod and the service B' container pod but the service A container pod is not required to communicate with the service C container pod or the service C' container pod. However, the service B container pod and the service B' container pod is expected to communicate with both the service A container pod and the service C' container pod. Accordingly, the service B container pod and the service B' container pod may be classified as regular container pods, while the other container pods may be classified as selective pods.

In configurations, IP/MAC routes may be propagated (using control plane protocol such as BGP) or programmed (using management plane protocol such as Netconf) in the relevant VTEPs as follows. For example, a first VTEP and a second VTEP corresponding to the worker node for the service A container pod may be programmed only with the IP/MAC route of the service B container pod and the service B' container pod. There are no details about the service C container pod or the service C' container pod required. A third VTEP and fourth VTEP corresponding to the service B container pod and the service B' container pod are populated with all details related to services A, C and C'. A fifth VTEP and sixth VTEP corresponding to the service C and service C' container pods are programmed with service B container pod and service B' container pod IP/MAC routes.

While the present example is explained with limited scale, real world deployment may involve tens or even thousands of workloads where the use of techniques in accordance with the present disclosure may drastically simplify the deployment allowing Cloud environments and network functions to adapt to the resources demanded by services.

As previously noted, in configurations, when any service container pod is moved or gets terminated, the K8S master node may have either the update Istio/Sidecar config update the route distribution policy or may have the appropriate notification that can be used as a trigger to update the route distribution policy. The notification may be a message related to service container pod creation, service container pod deletion, or service container pod modification that is observed by the K8S master node.

Figure 1:
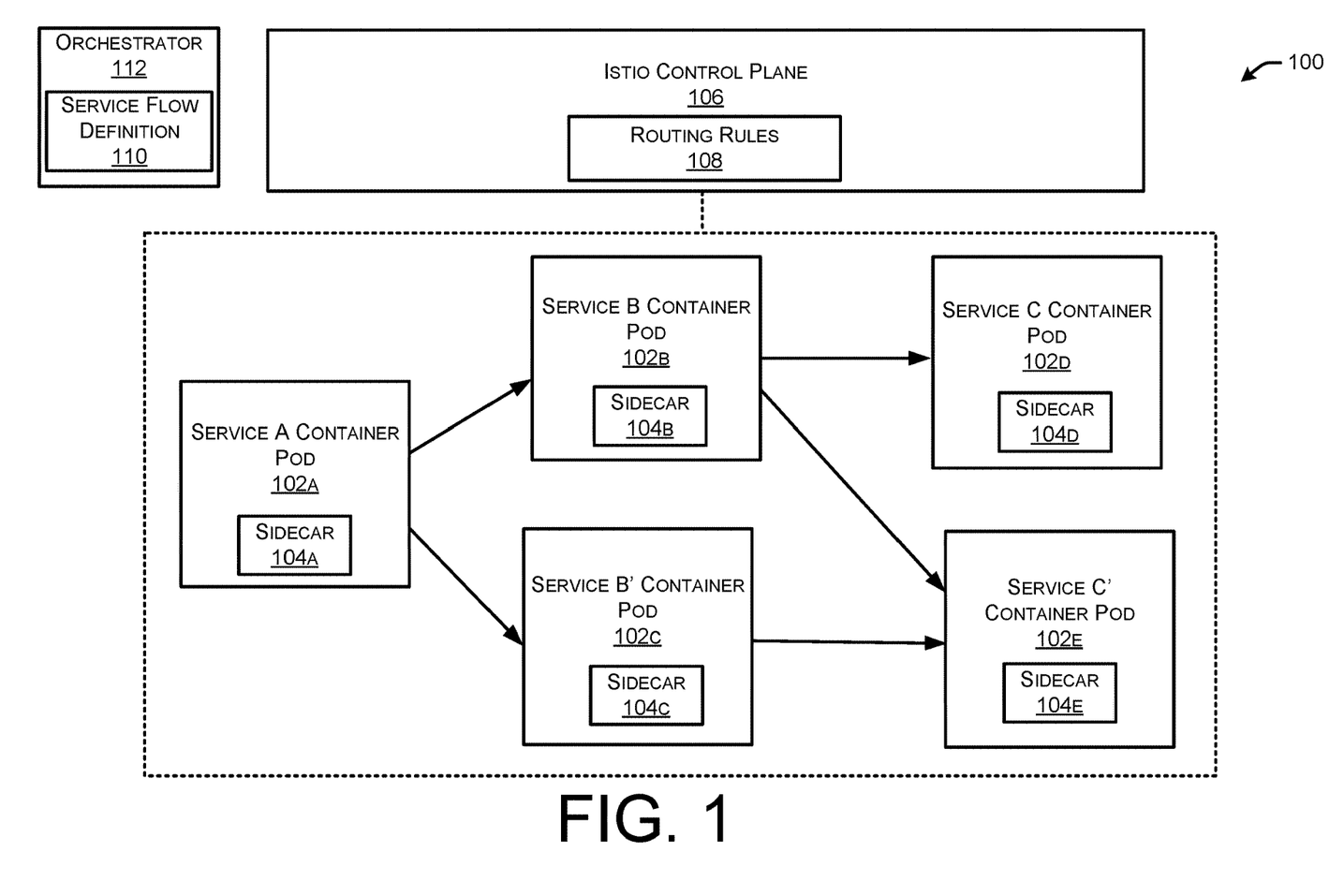
FIG. 1 schematically illustrates a service flow in a DC/WAN environment that includes service container pods including corresponding sidecars.

FIG. 1 schematically illustrates a service flow in a DC/WAN environment 100 that includes 5 service container pods 102a-102e including corresponding sidecars 104a-104e. As previously noted, with current cloud-based networks, modern applications utilize Istio/Sidecar based service definitions to describe the services and their relationship including routing rules, traffic, steering, etc. The present disclosure leverages this information to analyze and formulate service flows (also known as container pod communication flows), e.g., which container pods talk to which container pods. For example, an Istio control plane 106 may provide routing rules 108 listed in Istio SideCar/Envoy. For example, routing rules for service A container pod 102a with respect to service B container pod 102b for the example of FIG. 1 may include:

```
apiVersion: networking.istio.io/v1alpha3
kind: VirtualService
metadata:
    name: vnf
spec:
    hosts:
    - ServiceA
    - match: *
    - route:
            - destination:
                host: ServiceB
                subset: v2
    - route:
            - destination:
                host: ServiceB
                subset: v3
apiVersion: networking.istio.io/v1alpha3
kind: DestinationRule
metadata:
    name: vnf-rule
spec:
    host: ServiceB
    trafficPolicy:
        loadbalancer:
                simple: ROUND_ROBIN
    subsets:
        - name: v2
        labels:
            version: v1
        - name: v3
        labels:
            version: v2
```

Accordingly, the first container pod 102a may provide service A for data packets while two other container pods 102b, 102c may provide service B and service B', respectively. Once a data packet has been received by service A from service container pod 102a, the data packet may be forwarded to one of either the service B container pod 102b or the service B' container pod 102c. In general, the service B' is related to service B but may be a newer version of service B that includes updates, security patches, etc. Generally, prior to routing data packets to service B' instead of service B, service B' needs to be tested and verified before all data packets are routed from the service A container pod 102a to the service B' container pod 102c instead of the service B container pod 102b, e.g., before the service B' container pod 102c may replace the service B container pod 102b.

In the present example, the fourth and fifth service container pods 102d, 102e may provide service C and service C', respectively. As with service B and service B', service C' is a newer and/or updated version of service C. Once data packets have received service B at the service B container pod 102b, the data packets may be routed from the service B container pod 102b to either the service C container pod 102d or the service C' container pod 102e. However, in the present example, data packets from the service B' container pod 102c may only be routed to the service C' container pod 102e. Per the Istio/Sidecar config in the example of FIG. 1, the service container pod communication flow for the virtual network function (vnf) service can be formulated as follows: the service A container pod 102a may load balance the traffic between the service B container pod 102b and the service B' container pod 102c; the service B container pod 102b may load balance between the service C container pod 102d and the service C' container pod 102e. Finally, as previously noted, the service B' container pod 102c, in configurations, may forward traffic only to the service C' container pod 102e.

Thus, based on the example of FIG. 1, a service flow definition 110 may be formulated by an orchestrator 112 of a computer network platform of the DC/WAN, e.g., Istio and/or Kubernetes (K8S). For the present example service flow definition, the service A container pod 102a must reach, e.g., communicate with the service B container pod 102b and the service B' container pod 102c. However, the service A container pod 102a does not need reachability, e.g., connectivity, to the service C container pod 102d or the service C' container pod 102e. The service B container pod 102b must reach, e.g., have connectivity to, the service A container pod 102a, the service C container pod 102d, and the service C' container pod 102e. The service B' container pod 102c must reach, e.g., have connectivity to, the service C' container pod 102e and the service A container pod 102a. However, the service B' container pod 102c does not need reachability, e.g., connectivity to, the service C container pod 102d. The service C container pod 102d must reach, e.g., have connectivity to, the service B container pod 102b, while the service C' container pod 102e must reach, e.g., have connectivity to, the service B container pod 102b and the service B' container pod 102c. In configurations, based on this service flow definition for the example of FIG. 1, a regular container pod may be defined as a container pod that communicates with all the container pods related to that service. However, a selective container pod may be defined as a container pod that communicates with only specific container pods with specific labels and/or does not communicate at all with specific container pods with specific labels. While the present disclosure uses the example of FIG. 1 in describing the remainder of the ideas of the present disclosure, it should be noted that the idea works for any service definition of any type and amounts of service container pods 102.

Figure 2:
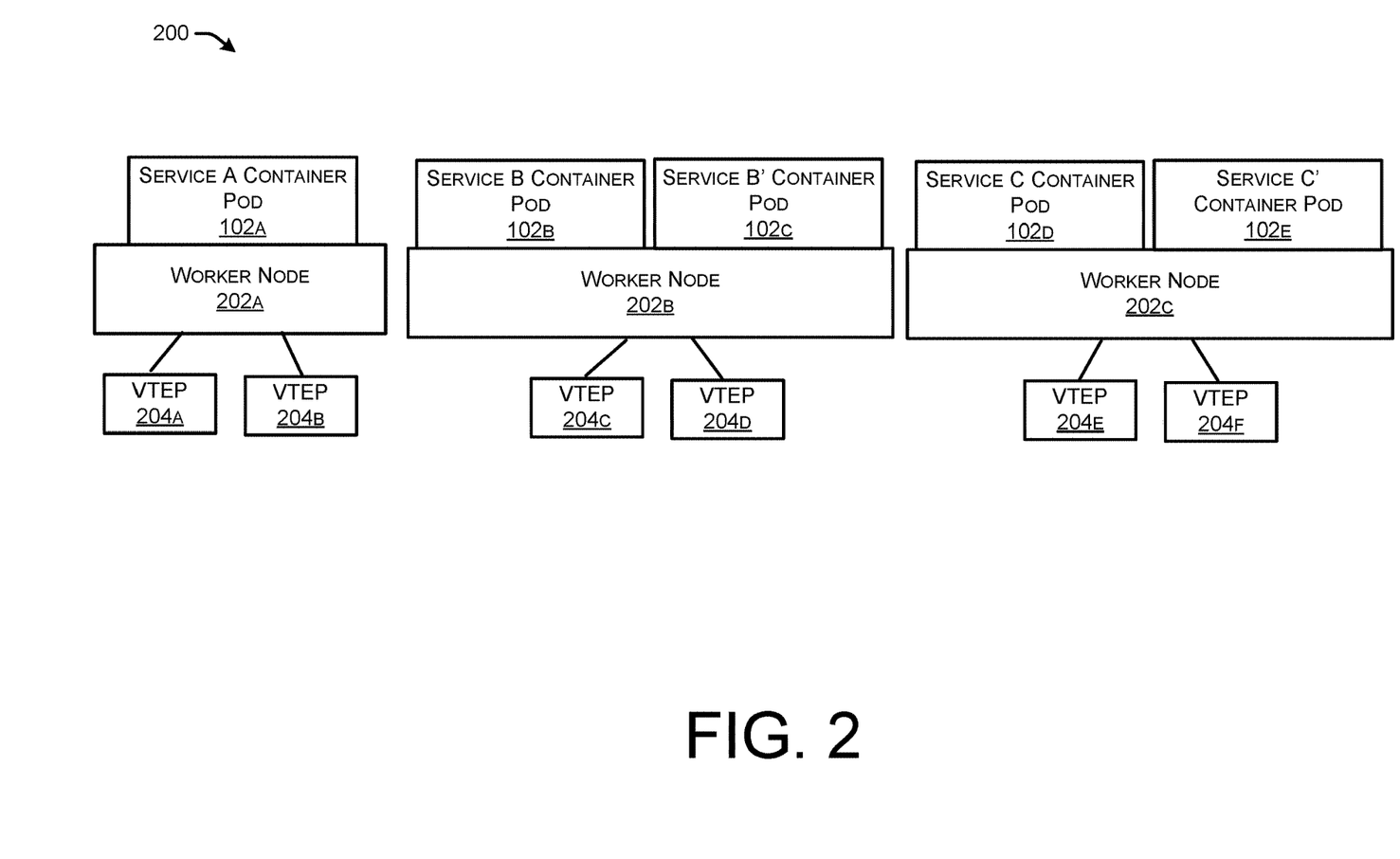
FIG. 2 schematically illustrates a cluster topology for nodes and VTEPs of the DC/WAN environment of FIG. 1.

Referring to FIG. 2, in configurations, a cluster topology 200 for nodes 202 of the DC/WAN 100 may be derived. The cluster topology 200 provides information about which service container pod 102 runs on which node 202, e.g., worker node, that is connected to which ToRs edge endpoint such as virtual extensible local area network (VxLAN) tunnel end points (VTEPs), MPLS tunnel end points, segment routing tunnel end points, etc. For example, service A container pod 102a may run on worker node 202a, service B container pod 102b and service B' container pod 102c may run on worker node 202b, and service C container pod 102d and service C' container pod 102e may run on worker node 202c. Also, for example, the worker node 202a may be connected to VTEPs 204a and 204b, the worker node 202b may be connected to VTEPs 204c and 204d, and the worker node 202c may be connected to VTEPs 204e and 204f.

In a configuration, the cluster topology 200 may be derived and kept up to date based on using init-container in a service container pod 102 (prior to running an application/service in the container pod). The init-container may run a utility that detects the ToRs/VTEPs to which the worker node is connected, e.g., using for example, link layer discovery protocol (LLDP). The init-container may then notify (via an application programming interface (API)) the mapping of the backend software defined networking (SDN)/VTEP controller (not illustrated in FIG. 2).

In another configuration, the cluster topology 200 may be derived by periodically communicating with the K8S master controller or orchestrator (and/or Istio controller or orchestrator) (e.g., orchestrator 112, not illustrated in FIG. 2) to detect service container pod 102 creation or deletion events and obtaining details about the service container pods 102 such as, for example, IP/MAC addresses, the related worker node (such as, for example, IP/MAC address), etc. The SDN controller may already be aware of which ToR/VTEP 204 has the IP/MAC addresses of each worker node 202 and its address resolution protocol (ARP)/neighbor discovery protocol (NDP) table. Alternatively, the SDN controller may poll the ToR/VTEPs as needed since worker nodes need to have communication (via layer two or layer three) with the K8S master controller or orchestrator via the ToR. This allows the SDN controller to create/update the mapping of service container pods 102 and corresponding worker nodes 202, as well as ToR/VTEP 204 connectivity with sufficient details. For example, for service container pod 102,

```
[
{
"service_name": "ServiceA",
"container_pod_ip": "10.",
"container_pod_mac": "0a:58:0a:f4:01:c4"
"WorkerNode_ip": "10.8.1.9",
"WorkerNode_name": "rtp-k8s-u-w1",
"vtep_list":
"vtep1_ip": "10.40.100.11",
"vtep2_ip": "10.40.200.11",
},
{.
"service_name": "ServiceB",
.
}
]
```

The K8S master controller or orchestrator (and/or Istio controller or orchestrator) may provide info (service container pod, worker node, etc.) as shown below in "kubectl get pods-o wide" output:

| k8sMaster$ kubectl get pods -o wide | | | | | | |
|---|---|---|---|---|---|---|
| NAME | READY | STATUS | RESTARTS | AGE | IP | NODE |
| service-a-869854b446-9czvw | 1/1 | Running | 0 | 12 s | 10.8.1.9 | k8sWorker-1 |
| service-a-869854b446-bm8bc | 1/1 | Running | 0 | 12 s | 10.8.1.5 | k8sWorker-1 |
| service-b-869854b446-2wwm9 | 1/1 | Running | 0 | 2 m 15 s | 10.8.2.7 | k8sWorker-2 |
| service-b-869854b446-zmh9q | 1/1 | Running | 0 | 2 m 15 s | 10.8.2.8 | k8sWorker-2 |
| service-c-869854b446-2m7ql | 1/1 | Running | 0 | 9 s | 10.8.3.10 | k8sWorker-3 |
| service-c-869854b446-t55bb k8sMaster$ | 1/1 | Running | 0 | 9 s | 10.8.3.6 | k8sWorker-3 |

Such logic enables an automatic formulation of cluster topology-physical connectivity among each ToR/VTEP 204 with which service container pods 102 may directly communicate. The SDN controller may use this information to formulate the VTEP configuration and routing distribution policies, as described further herein.

Figure 3:
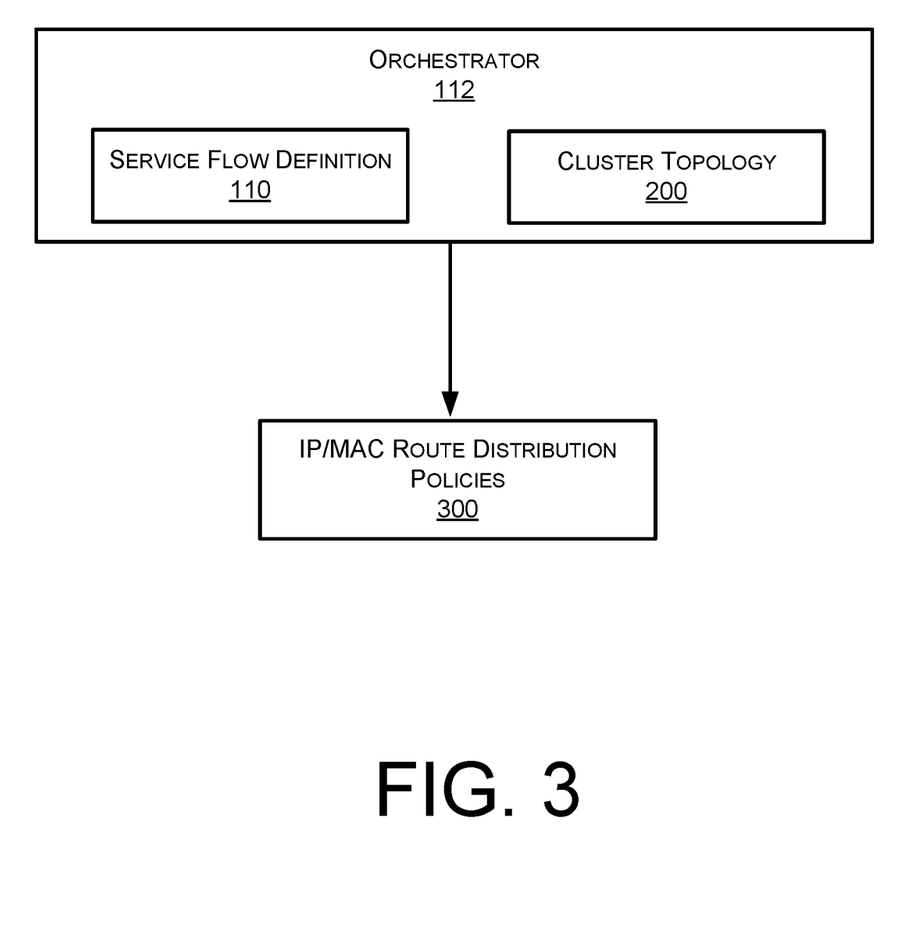
FIG. 3 schematically illustrates using the service flow definition and cluster topology to create IP/MAC route distribution policies.

Referring to FIG. 3, in configurations, once the service flow definition 110 and cluster topology 200 are defined, the K8S master controller or orchestrator (and/or Istio controller or orchestrator) 112 may create granular IP/MAC route distribution policies 300. In configurations, the route distribution policies may be specific to service container pods 102 that are newly instantiated.

For example, an example of an IP/MAC route distribution policy 300 may be formulated for the service A container pod 102a and the service B container pod 102b flow. A similar process may be followed for the route distribution policies among all service container pods 102. The abstracted IP/MAC route distribution policy may be viewed as:

```
{
"service_name": "ServiceA",
match - container_pod_ip: "10.100.1.1",
match - container_pod_mac: "0a:58:0a:f4:01:c1"
Local VTEPs Action:
advertise with - label AB, AB'
VTEP List:
VTEP11_IP, VTEP12_IP
Remote VTEPs Action:
receive with - label AB
VTEP List:
VTEP21_IP, VTEP22_IP
receive with - label AB'
VTEP List:
VTEP23_IP, VTEP24_IP
}
```

The above abstraction IP/MAC route policy may also be modeled in YANG for conversion into an appropriate TOR/VTEP configuration based on the operating system being used. For example, BGP Route-Target may be used as a label and an import/export map be used within the VPN instance. The IP/MAC routing policies may then be pushed, as further described herein, to the VTEPs listed in the above abstraction.

In configurations, when a service container pod 102 is classified as a regular pod, the attribute set may be null, which may imply that the service container pod 102 may be installed by any VTEPs. If a service container pod 102 is a selective pod, the attribute set may control the VTEP that installs the route. This may drastically improve the scale, resiliency and performance of the cluster.

Encoding the VTEP list in the attr_set may be done in one of the following manners:

1. Defining all VTEPs using an IP address. While straightforward, this option may increase the size of the attribute.

2. Bitmask approach. Each VTEP will be assigned with a unique Bit and use a bitmask encoded with relevant VTEPs bit-id. For example, VTEP1, VTEP2, VTEP3 and VTEP4 may be assigned with 0001, 0010, 0100 and 1000. By encoding 0110, it may be instructed that the update is for VTEP2 and VTEP3.

Figure 4:
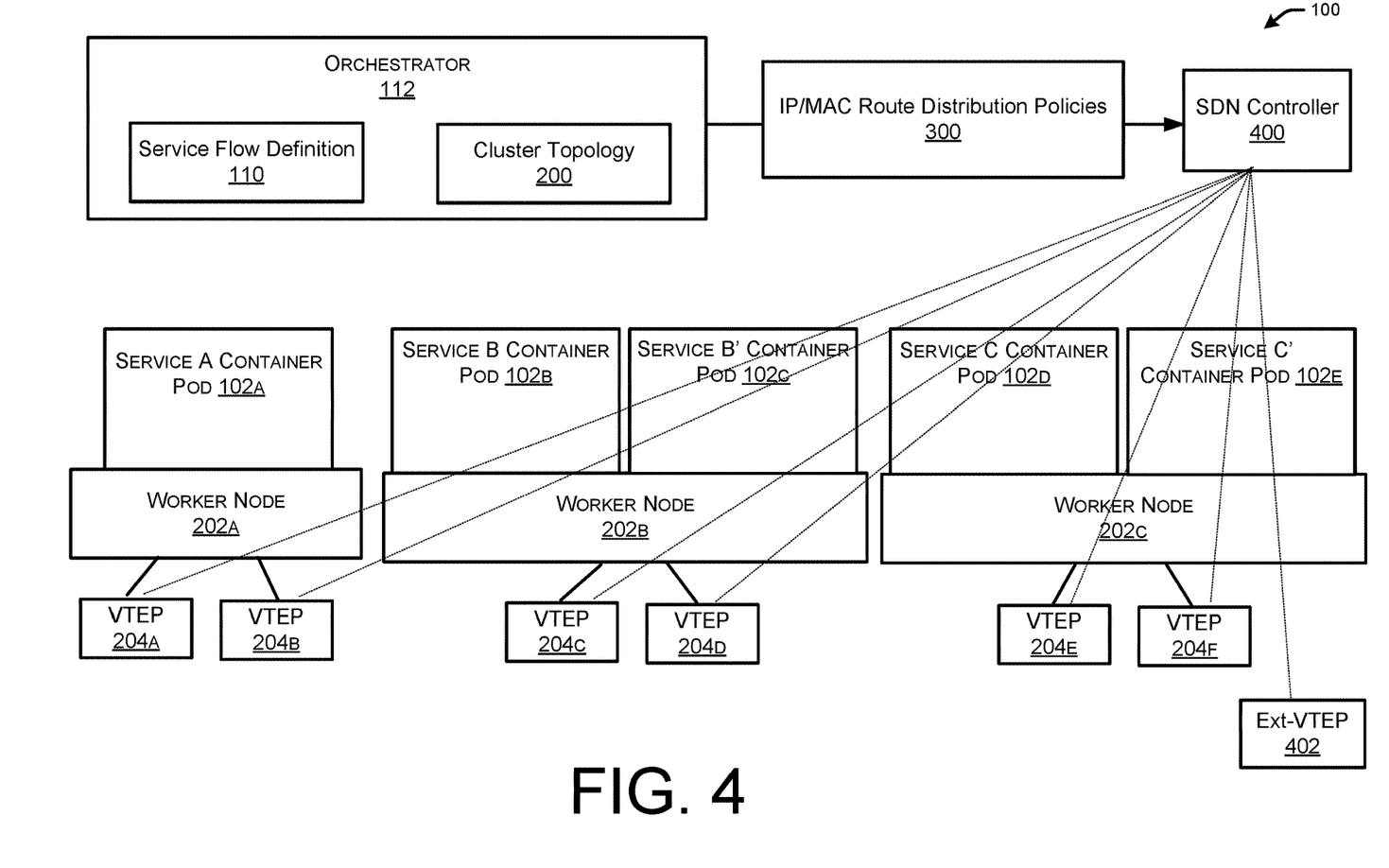
FIG. 4 schematically illustrates applying route distribution policies on VTEPs.

Referring to FIG. 4, once the route distribution policies 300 are created, the route distribution policies 300 may be applied on VTEPs 204. For example, in configurations an SDN controller 400 may be a dedicated process that runs on the K8S master controller (and/or Istio controller) 112 and establishes an EVPN-BGP session with all VTEPs 204 that are part of the cluster topology 200 (worker-node 202/VTEPs 204 and one or more external VTEP(s) (ext-VTEP(s) 402). The SDN controller 400 may thus also be known as a K8S-BGP-controller.

In FIG. 4, VTEP 204a, VTEP 204b, VTEP 204c, VTEP 204d, VTEP 204e and VTEP 204f are the worker node VTEPs connecting to K8S worker nodes 202. In configurations, VTEP 204b, VTEP 204d, and VTEP 204f may be included for redundancy. One or more ext-VTEP(s) 402 may serve as the front end VTEP for the service container pods 102 and provides connectivity outside the cluster 200. The SDN controller 400 may be, in configurations, a route controller daemon or process that may be running on the orchestrator node 112 or, in other configurations, on a dedicated node (not illustrated). Multiple controllers 400 (not illustrated) may be included for redundancy. In a configuration, Contiv may be leveraged (or BGP may be used/extended) as a control plane. Contiv may be used to exchange the routing policy info between the VTEPs 204.

The SDN controller 400 may have a BGP peering session with all worker nodes 202/VTEPs 204 and with one or more ext-VTEPs 402. The SDN controller 400 may use a route distribution policy 300 to determine which IP/MAC routes need to be advertised to the ext-VTEP(s) 402 and to each worker node 202/VTEP 204. Specifically, the SDN controller 400 may distribute to each worker node 202/VTEP 204 only the routes, e.g., MAC-only routes and/or IP/MAC routes, from other worker nodes 202/VTEPs 204 that are required by the particular service as well as all routes from the ext-VTEP(s) 402. The creation of the local IP/MAC routes on each worker nodes 202/VTEPs 204 may rely on the normal VXLAN EVPN flow allowing IP/MAC routes to be data plane driven. Once the local IP/MAC learning has occurred, the SDN controller 400 may advertise all IP/MAC routes from all worker nodes 202/VTEPs 204 to the ext-VTEP(s) 402. In configurations, the SDN controller 400 may reflect all IP/MAC routes learned from the ext-VTEP(s) 402 to all worker nodes 202/VTEPs 204. The ext-VTEP(s) 402 may have a BGP peering session with the SDN controller and with other VTEPs 204 in the EVPN environment (such as, for example out-VTEP-1, out-VTEP-n, SPINE-RR).

Applying the logic to the example topology of FIG. 4, the service A container pod 102a is expected to communicate with the service B container pod 102b and the service B' container pod 102c but the service A container pod 102a is not required to communicate with the service C container pod 102d or the service C' container pod 102e. However, the service B container pod 102b and the service B' container pod 102c is expected to communicate with both the service A container pod 102a and the service C' container pod 102d. Accordingly, the service B container pod 102b and the service B' container pod 102c may be classified as regular container pods, while the other container pods may be classified as selective pods.

In configurations, IP/MAC routes may be propagated/programmed in the relevant VTEPs 204 as follows. For example, the VTEP 204a and the second VTEP 204b corresponding to the worker node 202a for the service A container pod 102a may be programmed only with the IP/MAC route of the service B container pod 102b and the service B' container pod 102c. There are no details about the service C container pod 102d or the service C' container pod 102e required. The VTEP 204c and the VTEP 204d corresponding to the service B container pod 102b and the service B' container pod 102c are populated with all details related to services A, C, and C'. The VTEP 204e and the VTEP 204f corresponding to the service C container pod 102d and the service C' container pod 102e are programmed with service B container pod 102b and service B' container pod 102c IP/MAC routes.

In configurations, when any service container pod is moved or gets terminated, the SDN controller 400 may have either the update Istio/Sidecar config update the route distribution policy or may have an appropriate notification that can be used as a trigger to update the appropriate route distribution policy 300.

While the present examples are explained herein with limited scale, real world deployment may involve tens or even thousands of workloads where the use of techniques in accordance with the present disclosure may drastically simplify the deployment allowing Cloud environments and network functions to adapt to the resources demanded by services.

Figure 5:
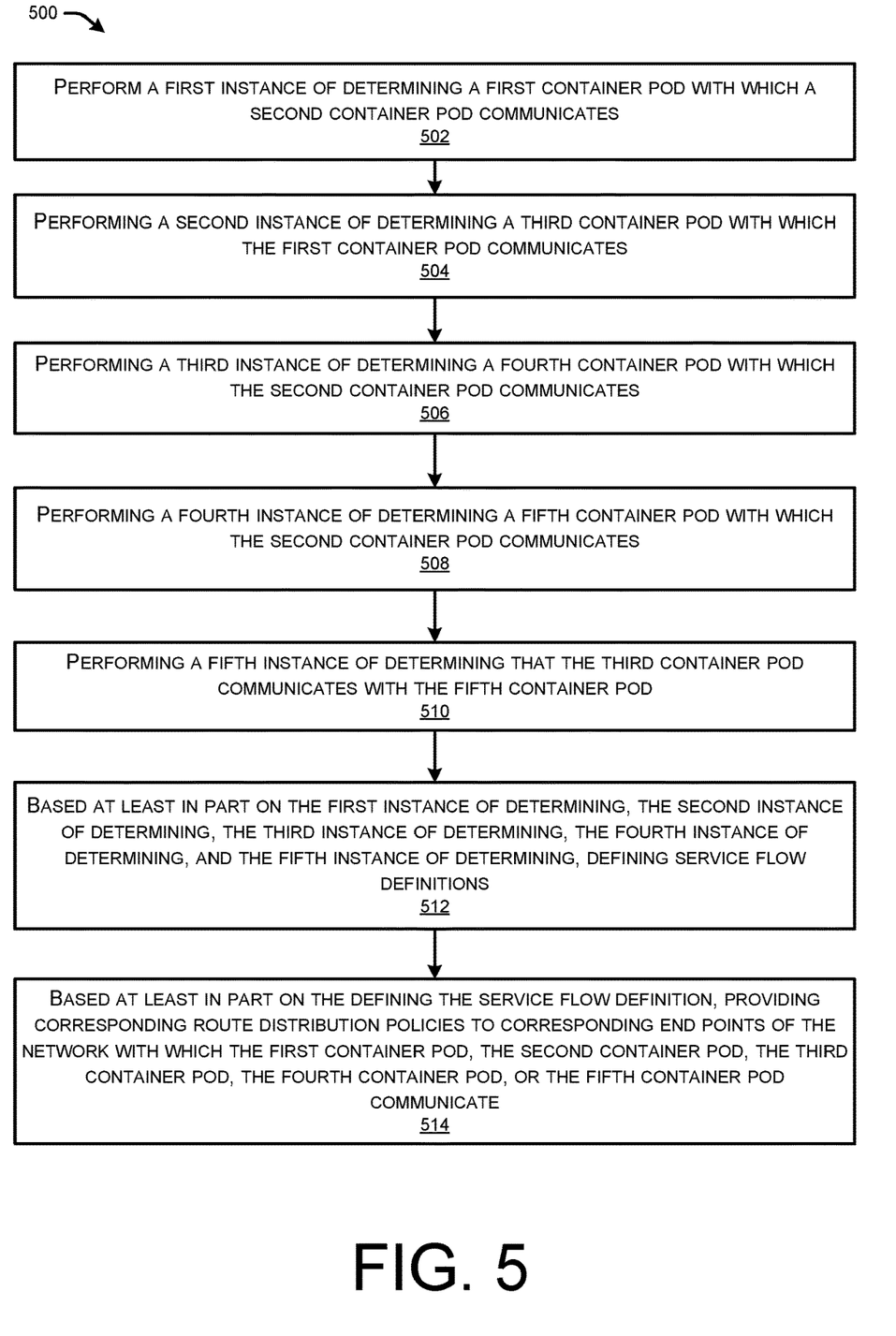
FIG. 5 illustrates a flow diagram of an example method for defining a service flow definition among container pods that provide services in a network.

FIG. 5 illustrates a flow diagram of an example method 500 and illustrates aspects of the functions performed at least partly by one or more devices in the DC/WAN 100 as described in FIGS. 1-4. The logical operations described herein with respect to FIG. 5 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 5 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

In particular, FIG. 5 illustrates a flow diagram of the example method 500 for defining a service flow definition among container pods that provide services in a network. In some examples, the method 500 may be performed by a system comprising one or more processors and one or more non-transitory computer-readable media storing computer-executable instructions that, when executed by the one or more processors, cause the one or more processors to perform the method 500.

At 502, an orchestrator of a computer network platform of a network performs a first instance of determining a first container pod with which a second container pod communicates. In configurations, the first container pod provides a first service and the second container pod provides a second service. At 504, the orchestrator performs a second instance of determining a third container pod with which the first container pod communicates. In configurations, the third container pod provides a third service. At 506, the orchestrator performs a third instance of determining a fourth container pod with which the second container pod communicates. In configurations, the fourth container pod provides a fourth service.

At 508, the orchestrator performs a fourth instance of determining a fifth container pod with which the second container pod communicates. In configurations, the fifth container pod provides a fifth service. At 510, the orchestrator performs a fifth instance of determining that the third container pod communicates with the fifth container pod. At 512, based at least in part on the first instance of determining, the second instance of determining, the third instance of determining, the fourth instance of determining, and the fifth instance of determining, the orchestrator defines service flow definitions. In configurations, the service flow definitions define paths among one or more of the first container pod, the second container pod, the third container pod, the fourth container pod, or the fifth container pod. At 514, based at least in part on the defining the service flow definition, corresponding route distribution policies are provided to corresponding end points of the network with which the first container pod, the second container pod, the third container pod, the fourth container pod, or the fifth container pod communicate.

Figure 6:
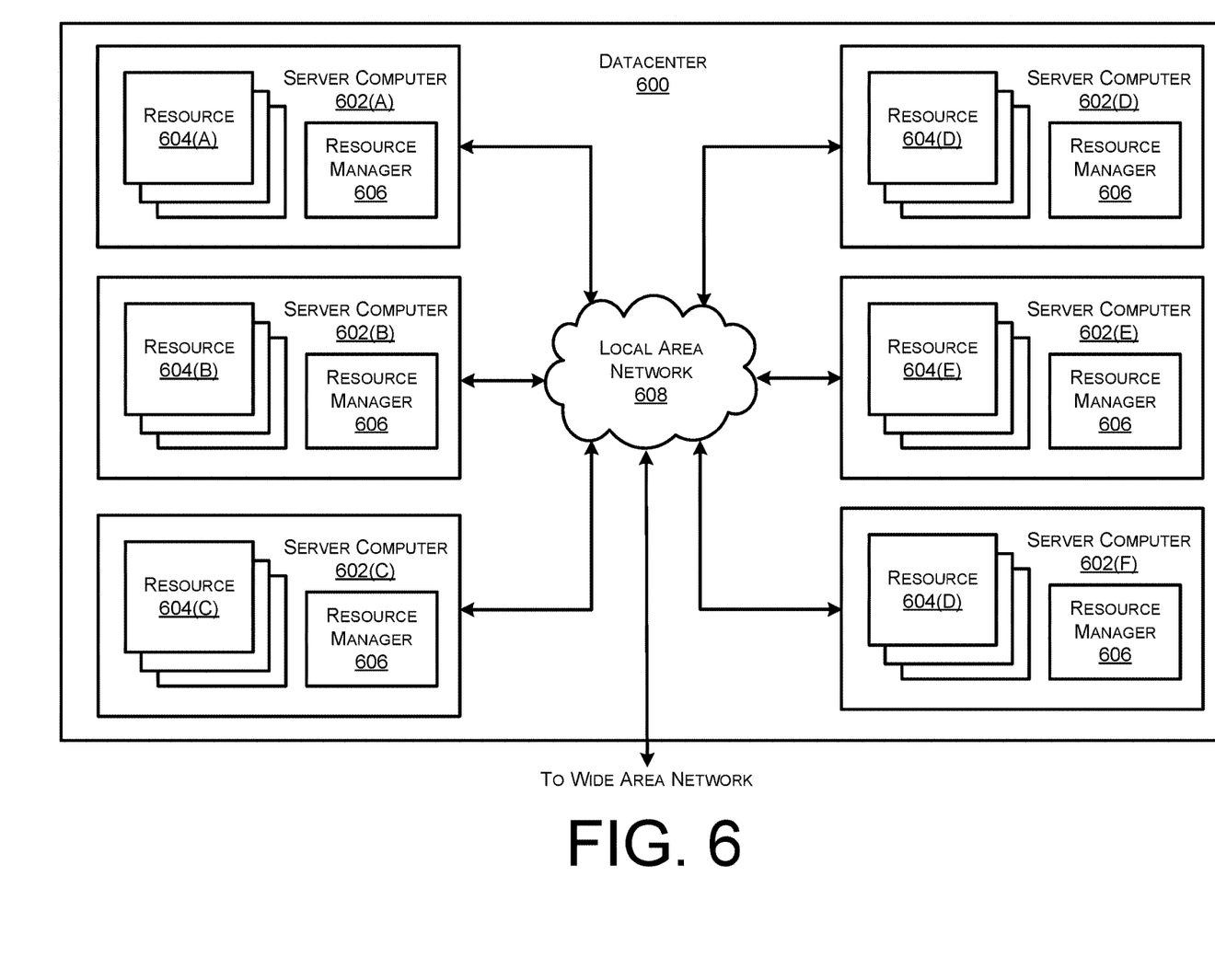
FIG. 6 illustrates a computing system diagram illustrating a configuration for a datacenter that can be utilized to implement aspects of the technologies disclosed herein.

FIG. 6 is a computing system diagram illustrating a configuration for a datacenter 600, e.g., DC/WAN 100, that can be utilized to implement aspects of the technologies disclosed herein. The example datacenter 600 shown in FIG. 6 includes several server computers 602A-602F (which might be referred to herein singularly as "a server computer 602" or in the plural as "the server computers 602") for providing computing resources. In some examples, the resources and/or server computers 602 may include, or correspond to, the service container pods 102 described herein.

The server computers 602 can be standard tower, rackmount, or blade server computers configured appropriately for providing computing resources. The computing resources may be provided by the cloud computing networks and can be data processing resources such as VM instances or hardware computing systems, database clusters, computing clusters, storage clusters, data storage resources, database resources, networking resources, and others. For example, the computing resources may include instantiating service container pods 102. Some of the servers 602 can also be configured to execute a resource manager capable of instantiating and/or managing the computing resources. In the case of VM instances, for example, the resource manager can be a hypervisor or another type of program configured to enable the execution of multiple VM instances on a single server computer 602. Server computers 602 in the datacenter 600 can also be configured to provide network services and other types of services.

In the example datacenter 600 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between datacenters 600, between each of the server computers 602A-602F in each datacenter 600, and, potentially, between computing resources in each of the server computers 602. It should be appreciated that the configuration of the datacenter 600 described with reference to FIG. 6 is merely illustrative and that other implementations can be utilized.

In some examples, the server computers 602 may each execute one or more virtual resources that support a service or application provisioned across a set or cluster of servers 602. The virtual resources on each server computer 602 may support a single application or service, or multiple applications or services (for one or more users).

In some instances, the cloud computing networks may provide computing resources, like application containers, VM instances, and storage, on a permanent or an as-needed basis. Among other types of functionality, the computing resources provided by cloud computing networks may be utilized to implement the various services described above. The computing resources provided by the cloud computing networks can include various types of computing resources, such as data processing resources like application containers and VM instances, data storage resources, networking resources, data communication resources, network services, and the like.

Each type of computing resource provided by the cloud computing networks can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services, and/or other types of programs. Data storage resources can include file storage devices, block storage devices, and the like. The cloud computing networks can also be configured to provide other types of computing resources not mentioned specifically herein.

The computing resources provided by the cloud computing networks may be enabled in one embodiment by one or more datacenters 600 (which might be referred to herein singularly as "a datacenter 600" or in the plural as "the datacenters 600"). The datacenters 600 are facilities utilized to house and operate computer systems and associated components. The datacenters 600 typically include redundant and backup power, communications, cooling, and security systems. The datacenters 600 can also be located in geographically disparate locations. One illustrative embodiment for a server computer 602 that can be utilized to implement the technologies disclosed herein will be described below with regard to FIG. 4.

Figure 7:
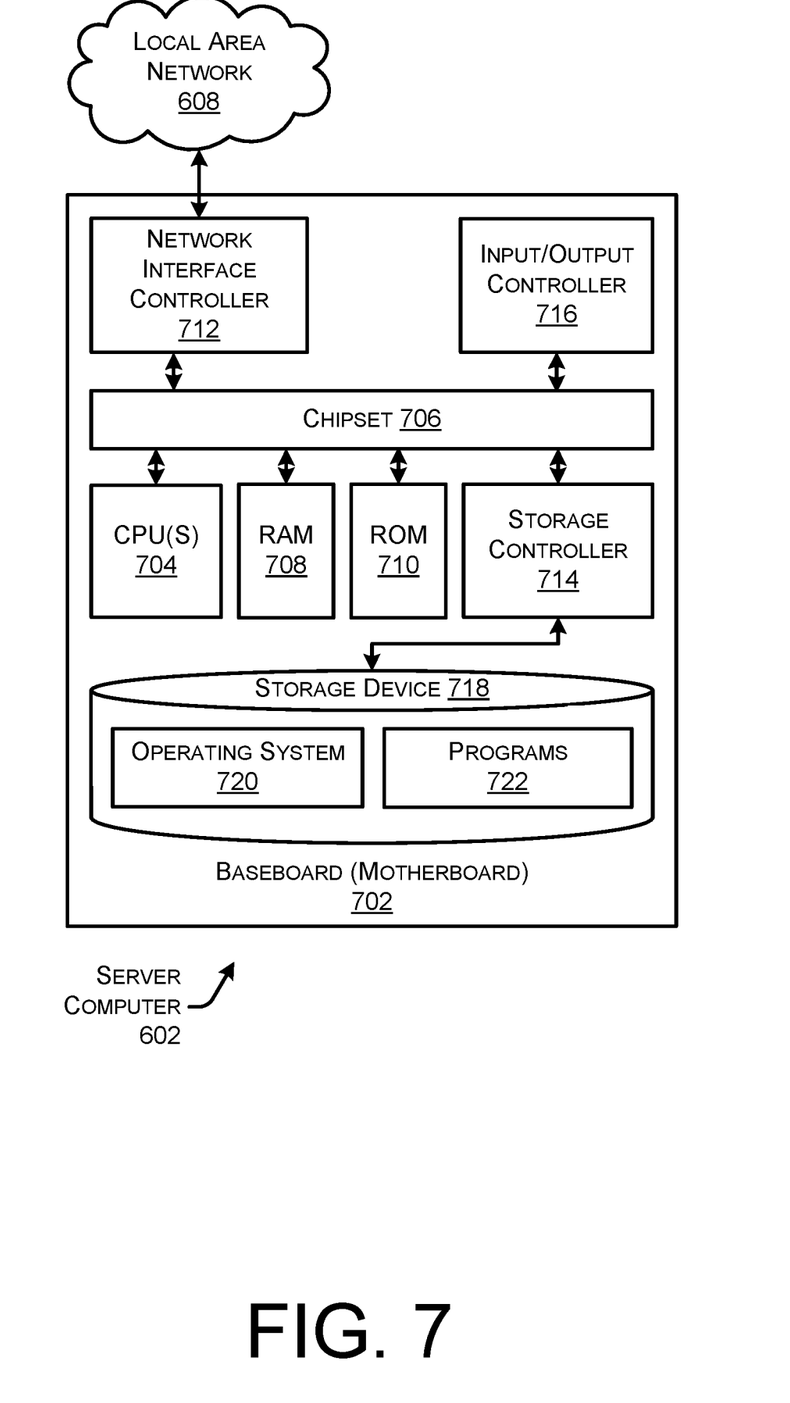
FIG. 7 is a computer architecture diagram showing an illustrative computer hardware architecture for implementing a server device that can be utilized to implement aspects of the various technologies presented herein.

FIG. 7 shows an example computer architecture for a server computer 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The server computer 602 may, in some examples, correspond to physical devices or resources described herein.

The server computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the server computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the server computer 602. The chipset 706 can further provide an interface to a computer-readable storage medium such as a read-only memory ("ROM") 710 or non-volatile RAM ("NVRAM") for storing basic routines that help to startup the server computer 602 and to transfer information between the various components and devices. The ROM 710 or NVRAM can also store other software components necessary for the operation of the server computer 602 in accordance with the configurations described herein.

The server computer 602 can operate in a networked environment using logical connections to remote computing devices and computer systems through a network, such as the network 608. The chipset 706 can include functionality for providing network connectivity through a NIC 712, such as a gigabit Ethernet adapter. The NIC 712 is capable of connecting the server computer 602 to other computing devices over the network 608. It should be appreciated that multiple NICs 712 can be present in the server computer 602, connecting the computer to other types of networks and remote computer systems.

The server computer 602 can be connected to a storage device 718 that provides non-volatile storage for the computer. The storage device 718 can store an operating system 720, programs 722, and data, which have been described in greater detail herein. The storage device 718 can be connected to the server computer 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the server computer 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 602 can further read information from the storage device 718 by detecting the physical states or characteristics of one or more particular locations within the physical storage units.

In addition to the mass storage device 718 described above, the server computer 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 602. In some examples, the operations performed by the cloud computing network, and or any components included therein, may be supported by one or more devices similar to server computer 602. Stated otherwise, some or all of the operations performed by the cloud computing networks 102a and 102b, and or any components included therein, may be performed by one or more server computers 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the server computer 602. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the server computer 602.

In one embodiment, the storage device 718 or other computer-readable storage media is encoded with computer-executable instructions which, when loaded into the server computer 602, transform the computer from a general-purpose computing system into a special-purpose computer capable of implementing the embodiments described herein. These computer-executable instructions transform the server computer 602 by specifying how the CPUs 704 transition between states, as described above. According to one embodiment, the server computer 602 has access to computer-readable storage media storing computer-executable instructions which, when executed by the server computer 602, perform the various processes described above with regard to FIGS. 1-5. The server computer 602 can also include computer-readable storage media having instructions stored thereupon for performing any of the other computer-implemented operations described herein.

The server computer 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the server computer 602 might not include all of the components shown in FIG. 7, can include other components that are not explicitly shown in FIG. 7, or might utilize an architecture completely different than that shown in FIG. 7.

The server computer 602 may support a virtualization layer, such as one or more virtual resources executing on the server computer 602. In some examples, the virtualization layer may be supported by a hypervisor that provides one or more virtual machines running on the server computer 602 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:
1. A method comprising:
a first instance of determining, by an orchestrator of a computer network platform of a network, a first container pod with which a second container pod communicates, the first container pod providing a first service and the second container pod providing a second service;
a second instance of determining, by the orchestrator, a third container pod with which the first container pod communicates, the third container pod providing a third service;
a third instance of determining, by the orchestrator, a fourth container pod with which the second container pod communicates, the fourth container pod providing a fourth service;
a fourth instance of determining, by the orchestrator, a fifth container pod with which the second container pod communicates, the fifth container pod providing a fifth service;
a fifth instance of determining, by the orchestrator, that the third container pod communicates with the fifth container pod;
based at least in part on the first instance of determining, the second instance of determining, the third instance of determining, the fourth instance of determining, and the fifth instance of determining, defining, by the orchestrator, service flow definitions, the service flow definitions defining paths among one or more of the first container pod, the second container pod, the third container pod, the fourth container pod, or the fifth container pod;
determining a cluster topology indicating corresponding nodes of the network on which each container pod is hosted and the corresponding end points with which the corresponding nodes communicate; and
based at least in part on (i) the service flow definition and (ii) the cluster topology, providing corresponding route distribution policies to corresponding end points of the network with which the first container pod, the second container pod, the third container pod, the fourth container pod, or the fifth container pod communicate.

2. The method of claim 1, wherein the third service is related to the second service and the fifth service is related to the fourth service.

3. The method of claim 1, wherein:
the first container pod is hosted by a first node;
the third service is related to the second service, and the second container pod and the third container pod are co-hosted by a second node; and
the fifth service is related to the fourth service, and the fourth container pod and the fifth container pod are co-hosted by a third node.

4. The method of claim 1, wherein:
providing the corresponding route distribution policies to the corresponding end points comprises providing the corresponding route distribution policies to the corresponding end points based on a unique internet protocol (IP) address of each end point of the corresponding end points.

5. The method of claim 1, further comprising:
assigning a unique bit identification to each end point of the corresponding end points,
wherein providing the corresponding route distribution policies to the corresponding end points comprises providing the corresponding distribution policies to the corresponding end points based on the unique bit identification.

6. The method of claim 1, further comprising:
based on one of (i) one of the first, second, third, fourth, or fifth container pods moving to a different node or (ii) one of the first, second, third, fourth, or fifth container pods terminating, updating one or more of the corresponding route distribution policies.

7. A system comprising:
one or more processors; and
one or more non-transitory computer-readable media storing computer-executable instructions that, when executed by the one or more processors, cause the one or more processors to perform actions comprising:
a first instance of determining a first container pod with which a second container pod communicates, the first container pod providing a first service and the second container pod providing a second service;
a second instance of determining a third container pod with which the first container pod communicates, the third container pod providing a third service;
a third instance of determining a fourth container pod with which the second container pod communicates, the fourth container pod providing a fourth service;
a fourth instance of determining a fifth container pod with which the second container pod communicates, the fifth container pod providing a fifth service;
a fifth instance of determining that the third container pod communicates with the fifth container pod;
based at least in part on the first instance of determining, the second instance of determining, the third instance of determining, the fourth instance of determining, and the fifth instance of determining, defining service flow definitions, the service flow definitions defining paths among one or more of the first container pod, the second container pod, the third container pod, the fourth container pod, or the fifth container pod;
determining a cluster topology indicating corresponding nodes of a network on which each container pod is hosted and the corresponding end points with which the corresponding nodes communicate; and
based at least in part on (i) the service flow definition and (ii) the cluster topology, providing corresponding route distribution policies to corresponding end points of the network with which the first container pod, the second container pod, the third container pod, the fourth container pod, or the fifth container pod communicate.

8. The system of claim 7, wherein the third service is related to the second service and the fifth service is related to the fourth service.

9. The system of claim 7, wherein:
the first container pod is hosted by a first node;
the third service is related to the second service, and the second container pod and the third container pod are co-hosted by a second node; and
the fifth service is related to the fourth service, and the fourth container pod and the fifth container pod are co-hosted by a third node.

10. The system of claim 7, wherein:
providing the corresponding route distribution policies to the corresponding end points comprises providing the corresponding route distribution policies to the corresponding end points based on a unique internet protocol (IP) address of each end point of the corresponding end points.

11. The system of claim 7, wherein the actions further comprise:
assigning a unique bit identification to each end point of the corresponding end points,
wherein providing the corresponding route distribution policies to the corresponding end points comprises providing the corresponding route distribution policies to the corresponding end points based on the unique bit identification.

12. The system of claim 7, wherein the actions further comprise:
based on one of (i) one of the first, second, third, fourth, or fifth container pods moving to a different node or (ii) one of the first, second, third, fourth, or fifth container pods terminating, updating one or more of the corresponding route distribution policies.

13. One or more non-transitory computer-readable media storing computer-executable instructions that, when executed by one or more processors, cause the one or more processors to perform actions comprising:
a first instance of determining a first container pod with which a second container pod communicates, the first container pod providing a first service and the second container pod providing a second service;
a second instance of determining a third container pod with which the first container pod communicates, the third container pod providing a third service;
a third instance of determining a fourth container pod with which the second container pod communicates, the fourth container pod providing a fourth service;
a fourth instance of determining a fifth container pod with which the second container pod communicates, the fifth container pod providing a fifth service;
a fifth instance of determining that the third container pod communicates with the fifth container pod;
based at least in part on the first instance of determining, the second instance of determining, the third instance of determining, the fourth instance of determining, and the fifth instance of determining, defining service flow definitions, the service flow definitions defining paths among one or more of the first container pod, the second container pod, the third container pod, the fourth container pod, or the fifth container pod;

determining a cluster topology indicating corresponding nodes of a network on which each container pod is hosted and the corresponding end points with which the corresponding nodes communicate; and based at least in part on (i) the service flow definition and (ii) the cluster topology, providing corresponding route distribution policies to corresponding end points of the network with which the first container pod, the second container pod, the third container pod, the fourth container pod, or the fifth container pod communicate.

14. The one or more non-transitory computer-readable media of claim 13, wherein:

the first container pod is hosted by a first node;

the third service is related to the second service, and the second container pod and the third container pod are co-hosted by a second node; and the fifth service is related to the fourth service, and the fourth container pod and the fifth container pod are co-hosted by a third node.

15. The one or more non-transitory computer-readable media of claim 13, wherein:

providing the corresponding route distribution policies to the corresponding end points comprises providing the corresponding route distribution policies to the corresponding end points based on a unique internet protocol (IP) address of each end point of the corresponding end points.

16. The one or more non-transitory computer-readable media of claim 13, wherein the actions further comprise:

assigning a unique bit identification to each end point of the corresponding end points, wherein providing the corresponding route distribution policies to the corresponding end points comprises providing the corresponding route distribution policies to the corresponding end points based on the unique bit identification.

17. The one or more non-transitory computer-readable media of claim 13, wherein the actions further comprise:

based on one of (i) one of the first, second, third, fourth, or fifth container pods moving to a different node or (ii) one of the first, second, third, fourth, or fifth container pods terminating, updating one or more of the corresponding route distribution policies.

* * * * *